April 27, 1943.    M. F. SAYLOR    2,317,347
NUT LOCKING DEVICE
Filed March 24, 1939
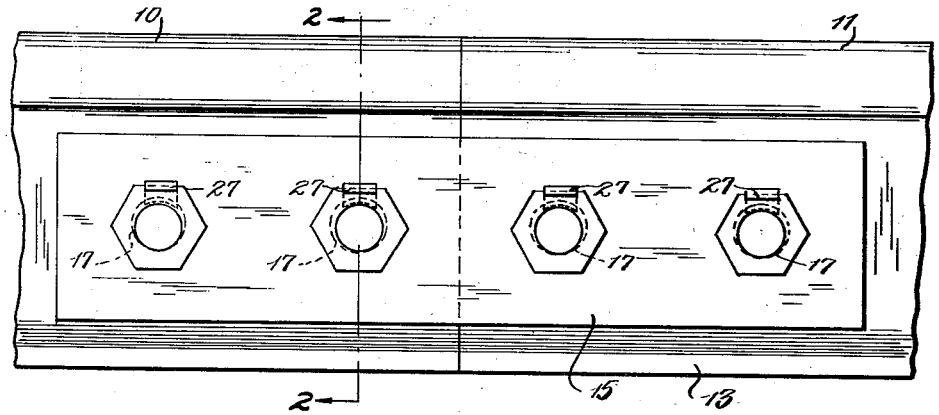
FIG. 1
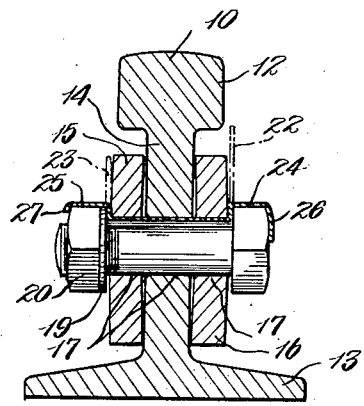
FIG. 2
FIG. 3    FIG. 4
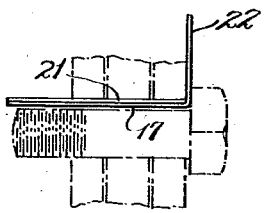
FIG. 5
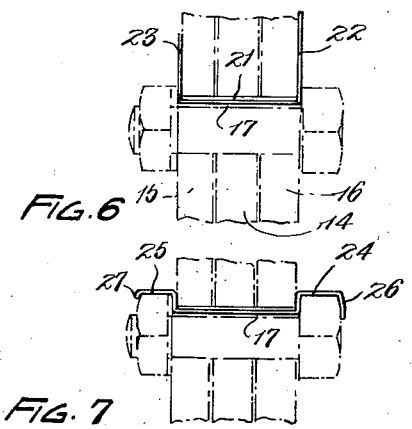
FIG. 6
FIG. 7
INVENTOR.
MICHAEL F. SAYLOR.
BY
ATTORNEY.

Patented Apr. 27, 1943

2,317,347

UNITED STATES PATENT OFFICE 2,317,347

NUT LOCKING DEVICE

Michael F. Saylor, Elyria, Ohio

Application March 24, 1939, Serial No. 263,965

2 Claims. (Cl. 151—8)

This invention relates to an improved means for securing against accidental displacement the nut and bolt connections of assembled structures.

In the past it has been common practice to employ nuts and bolts solely for connecting relatively stationary assembled structures and when subject to vibration to employ the well known lock washer or lock nut as a safety feature. Neither of these practices however, have been entirely efficient due to the fact that under most conditions the nuts eventually become loose with the result that stress and strain are set up in the structure ultimately causing weakness, excessive wear and fatigue. The use of such nut and bolt connections therefore, requires periodic inspection and replacement which is expensive and inefficient.

It is therefore, an object of the present invention to provide a locking means for nut and bolt connections which are positive in securement, simple in attachment, and inexpensive to manufacture.

Another object of the present invention is to provide a locking means which can be adapted to bolt connections of different lengths without requiring adjustment or a multiplicity of different sizes to become so adapted.

Another object of the present invention is to provide the locking means in continuous strip form readily cut to the desired length on the job to thereby eliminate wastage.

Another object of the present invention is to provide a locking means adapted for securement with the bolt and nut connections without the necessity of cutting or forming grooves or slots in the latter which thereby would weaken the connections.

With the objects above indicated and other objects hereinafter explained in view, my invention consists in the construction and combination of elements hereinafter described and claimed.

Referring to the drawing:

Figure 1 is a front elevational view of a sectional rail and bolted connection, the latter being provided with locking means embodying the present invention.

Figure 2 is a transverse sectional view taken on line 2—2 of Figure 1 and showing in detail the locking means embodying the invention.

Figures 3 and 4 are front and end views respectively of the metal strip comprising the locking means in its original form.

Figure 5 diagrammatically illustrates the metal strip inserted in the bolt opening and the first bend.

Figure 6 is similar to Figure 5 showing the second bend and the application of the nut.

Figure 7 is similar to Figure 6 showing the final bends engaging the nut and bolt head respectively.

In the drawing, I have illustrated the invention in association with the nut and bolt connections of a common type of rail joint because of its particular adaptation to that type of structure but it should be understood that the invention is not so restricted and may therefore have wide application.

Referring more particularly to Figures 1 and 2, adjacent rail sections 10 and 11 are disposed in abutting relation and rest upon cross ties (not shown) which in turn are supported upon the ordinary road bed. A pair of these continuous rail sections disposed in parallel spaced relation provide the common track over which railway cars and engines travel. The rails comprise a head 12, a base 13, and an integrally formed connecting web 14 more clearly shown in Figure 2. The adjacent abutting rail sections such as 10 and 11, are connected together by a pair of splice plates 15 and 16 positioned upon opposite sides of the webs 14 and extending a considerable distance on opposite sides of the abutting ends as more clearly shown in Figure 1. The splice plates 15 and 16 are bent on a slight arc transversely and outwardly from the web 14 for a purpose to be later described. The splice plates and webs are provided with a plurality of aligned openings 17 spaced apart longitudinally of the rail sections to receive headed bolts 18, the shanks of which extend freely through the aligned openings and have their outer free ends exteriorly screwthreaded. Lock washers 19 are positioned upon the free ends of the shanks in engagement with the adjacent surface of the splice plate 15 and nuts 20 are screwed into the screwthreaded ends of the bolts tightly into engagement with the lock washers 19 to draw the splice plates and webs of the rail sections into rigid assembled relation, the accurately formed splice plates tending to align the rail section and maintain a tension thereon. The description thus far is typical of rail joints or connections at present in use and while employing a lock washer to insure rigidity or securement, constant vibration causes the nuts to become loosened so that periodic inspection is essential.

To prevent loosening of the nuts and consequential inspection to a minimum, I provide my improved locking means which comprises a narrow metal strip 21 of the desired length which is shown in Figures 3 and 4. This metal strip may be formed accurately in cross section to more closely conform to the shank of the bolt and the inner periphery of the aligned openings although it may be flat where the clearances permit. To apply the metal strip 21, it is first inserted through the aligned openings in the splice plates and web of the rail with about equal portions projecting beyond the outer faces of the splice plates. In this position, one projecting end portion is bent upwardly at 22 into engagement with the outer face of the splice plate 16 and the shank 18 of the bolt 17 is inserted into the aligned openings below the adjacent central portion of the strip, more clearly shown in Figure 5. The head of the bolt engages the upwardly bent portion 22 and is positioned so that a flat surface of the bolt head will be adjacent the latter. The opposite end portion of the strip is then bent upwardly at 23 and the lock washer 19 and nut 20 applied in the usual manner, more clearly shown in Figure 6. Finally the portions 22 and 23 are bent outwardly at 24 and 25 respectively into engagement with the adjacent flat side of the bolt head and nut and the extreme ends bent downwardly at 26 and 27 over the ends of the bolt head and nut as shown in Figure 7. This arrangement not only secures the nut against accidental loosening but also secures the bolt head and nut respectively against independent rotation about the axis of the bolt. This locking strip may be removed readily by merely bending the outer ends upwardly out of engagement with the nut and bolt head to permit removal of the latter and may be used over again if desired except that a new strip costs so little that it might be impracticable.

Again the strip may be used without bending the outer end into engagement with the bolt head at all but merely leaving it bent upwardly as at 22 although of course not so long. Furthermore the metal strip 21 may be formed in a long length and rolled for use upon the job and the desired lengths cut therefrom as needed to eliminate waste.

The metal strip may be used without the lock washer and still be as efficient. The width of the strip of course will vary depending upon the type of construction and the clearance provided between the shank of the bolt and the openings provided therefor. The adaptability of this locking means is great and therefore is not to be limited.

While I have described the preferred embodiment of the invention it is to be understood that I am not to be limited thereto inasmuch as changes and modifications may be resorted to without departing from the spirit of the invention as defined in the appended claims.

What is claimed is:

1. A bolted assembly comprising adjacent members having aligned openings, a bolt having its shank extending through the aligned openings in said members and its head engageable with the outer face of one of said members, a nut detachably engageable with the shank of said bolt for maintaining said members in assembled relation, and a locking means for said nut comprising a strip of metal having a portion extending through the aligned openings between the outer peripheral surface of said shank and inner peripheral surface of the openings, laterally extending portions disposed between the outer sides of said members and the inner adjacent surfaces of said nut and bolt head respectively and projecting end portions bent into engagement with one of the side faces of said nut and bolt head respectively for securing said nut against accidental removal.

2. A bolted assembly comprising adjacent members having aligned openings, a bolt having its shank extending through the aligned openings in said members and its head engageable with the outer face of one of said members, a nut detachably engageable with the shank of said bolt for maintaining said members in assembled relation, and a locking means for said nut comprising a strip of metal having a portion arcuate in cross section extending through the aligned openings between the outer peripheral surface of said shank and inner peripheral surface of the openings, laterally extending portions disposed between the outer sides of said members and the inner adjacent surfaces of said nut and bolt head respectively, and projecting end portions bent into engagement with one of the side faces of nut and bolt head respectively for securing said nut against accidental removal.

MICHAEL F. SAYLOR.